Nov. 10, 1953

E. W. ANDERSON ET AL
BOOSTER BATTERY CARTING AND EMERGENCY
SERVICING EQUIPMENT
Filed May 12, 1950

2,659,042

Emil W. Anderson
Virgil D. Anderson
INVENTORS

BY *Clarence A. O'Brien*
*and Harvey B. Jackson*
Attorneys

Patented Nov. 10, 1953

2,659,042

UNITED STATES PATENT OFFICE 2,659,042

BOOSTER BATTERY CARTING AND EMERGENCY SERVICING EQUIPMENT

Emil W. Anderson and Virgil D. Anderson,
Rugby, N. Dak.

Application May 12, 1950, Serial No. 161,578

1 Claim. (Cl. 320—2)

The present invention relates to improved ways and means whereby a booster battery with complemental switch controlled equipment and defective battery testing means may be wheeled or otherwise carted to a scene of needed emergency service and hooked directly to either a starter motor or a defective storage battery for starting a car which has become stalled because of a weak battery.

Conventionally, a mechanic is called upon to attach the leads of a booster battery to a defective vehicle battery or starter motor and in so doing very often finds it awkward to attach and hold the leads in their proper position. The present device is primarily designed to make the mechanic's work easier and more effective.

An important object of this invention is to provide a manually maneuverable wheeled carrier for use by a single attendant having a booster battery removably racked thereon and a switch panel and complemental cables adapted to be clamped to the vehicle battery or the starter motor with remote controlled off and on switch means for closing the circuit from a place of use while seated in the vehicle.

A further important object of the invention is to provide a wheeled carrier which is relatively simple in design and function and which, in addition to supporting a booster battery and novel switch panel and complemental conductors, also has a testing means on said panel for checking the voltage of the cells in the vehicle battery.

These, together with the various ancillary objects and features of the invention which will later become apparent as the following description proceeds, are attained by the device, a preferred embodiment of which has been illustrated, by way of example only, in the accompanying drawings, wherein.

Figure 1:
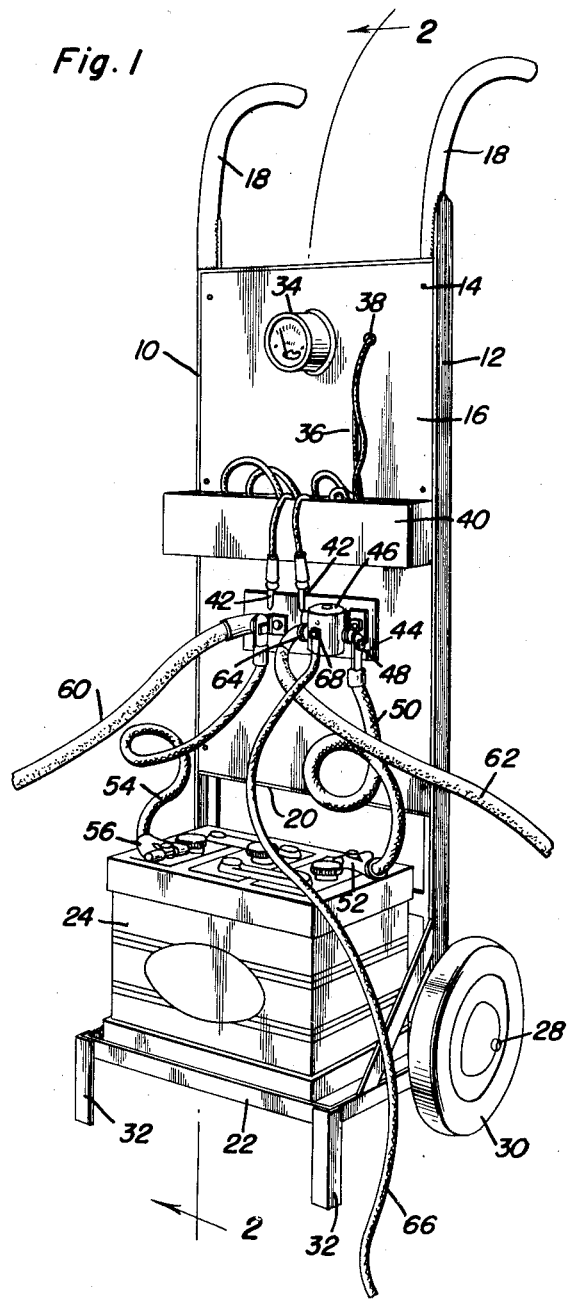
Figure 1 is a perspective view of the present device.
Figure 2:
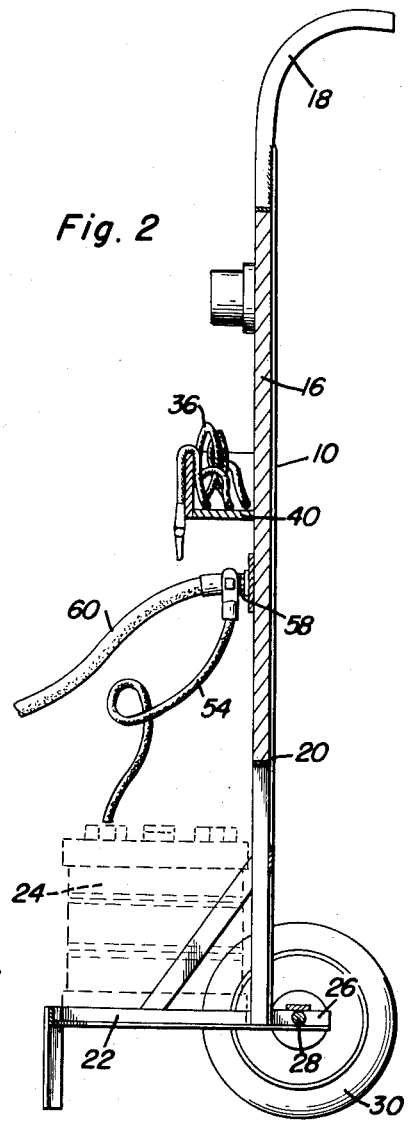
Figure 2 is a sectional view taken substantially on the section line 2—2 of Figure 1.

Briefly summarized and by way of introduction to the detailed description the apparatus hereinafter described has to do with carrier means characterized by a portable support, such as for example a wheeled truck or cart, said support having a booster battery removably mounted thereon, this preferably by way of a rack or the like on a support. The support is also provided with a panel and on this one panel there is systematically assembled a switch plate with a solenoid switch and conductor connections between same and the storage battery and connections for connection to the defective storage battery. There is also a remote controlled wire or conductor attached to the solenoid switch and having a push button switch on its free end, the latter being operable conveniently by the single attendant from within the vehicle, whereby to promote effective on the job service by a single mechanic or other attendant. The same panel is provided with effective battery testing means so essential in quickly ascertaining the chief source of trouble.

Specific reference will now be made to the drawings. In the several views, in the accompanying drawings and in the following specification, similar reference characters indicate corresponding elements throughout.

The present device is a substantially rectangular frame comprising spaced parallel angle iron side members 10 and 12 between which is secured by means of appropriate rivets 14 a novel switch panel 16. The upper corners of the rectangular frame include arcuate handle portions 18. Secured between the side members 10 and 12 adjacent their lower ends is a brace bar 20 and secured to the lower end of the side members is a U-shaped member 22 constructed of angle iron and, in effect, providing a rack or platform for supporting a booster battery 24. The legs of the U-shaped member extend beyond the side members, as at 26, and journal stub shafts 28 upon which are rotatably secured wheels 30. Welded or riveted to the corners of the U-shaped member 22 are legs 32 providing a proper self-standing support for the complete servicing equipment.

Mounted on the panel 16 adjacent its top edge is a conventional volt meter 34 operatively connected to conductor wires 36 which extend through a suitable aperture 38 in the panel, the conductor wires being received in a substantially rectangular box 40 mounted transversely of the frame, the free ends of the conductor wires including metallic or copper plugs 42 adapted for contact with the cells of a defective automotive vehicle storage battery for testing purposes.

Secured in the panel 16 below the box 40 is a metallic plate 44 upon which is mounted a conventional solenoid switch 46 which is operatively connected, as at 48, to a conductor 50 clamped, as at 62, to one of the posts of the booster battery 24. A further conductive wire 54 is clamped, as at 56, to the other post or terminal of the booster battery and is secured at its other end to a lug 58 carried by the plate 44. A first cable 60 is also secured to the lug 58 and is operatively connected to the conductor 54, the cable 60 being adapted for clamping by suitable means (not shown) upon one of the posts of the defective battery (not shown) or for contact with a starter motor (not shown). A second cable 62 is provided which is secured, as at 64, to the solenoid switch 46 and is also adapted for clamping to the other post of said defective battery or to the starter motor.

To close the circuit from the booster battery 24 to the cables 60 and 62 and eventually to the defective automotive vehicle battery or starter motor, an insulated two-strand wire is provided with one wire attached at one end, as at 68, to the solenoid switch 46, and the other wire grounded to the base of the solenoid switch. A push button starter switch (not shown) is operatively connected to the wires at the other or free end of the member 66. The member 66 can be taken into the car and when the ignition switch is turned on and the push button switch depressed, the circuit from the booster battery to the cables 60 and 62 will be closed and the car will start.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claim.

Having described the invention, what is claimed as new is:

For use by a single attendant, a self-contained auxiliary source of electrical energy for connection with an internal combustion engine starter motor comprising a manually maneuverable portable support, said support including a platform, a battery seated on said platform, a conductive mounting plate carried by said support, a solenoid starter switch carried by said mounting plate in electrically grounded relation, a first conductive cable connected at opposite ends to a first terminal post of said battery and said mounting plate to electrically ground said battery to said mounting plate, a second conductive cable having opposite ends connected to a second terminal post of said battery and to said solenoid switch, a third conductive cable having one end operatively connected with said first conductive cable, the opposite end of said third conductive cable being adapted to be operatively connected to a starter motor, a fourth conductive cable having one end connected to said solenoid switch, the opposite end of said fourth conductive cable being adapted to be operatively connected to the starter motor to form a complete electrical circuit, a relatively long double conductor cable electrically connected at one end to said solenoid switch, a switch electrically connected to the opposite end of said double conductor cable for selectively electrically connecting conductors of said double conductor cable to actuate said solenoid switch whereby an electrical circuit between said battery and a starter motor may be controlled from a remote point.

EMIL W. ANDERSON.
VIRGIL D. ANDERSON.

References Cited in the file of this patent

UNITED STATES PATENTS

| Number | Name | Date |
|---|---|---|
| D. 95,041 | Heyer | Apr. 2, 1935 |
| 1,004,101 | Stone | Sept. 26, 1911 |
| 1,408,400 | Richards | Feb. 28, 1922 |
| 1,459,726 | Goodheim | June 26, 1923 |
| 1,544,356 | Spaeth | June 30, 1925 |
| 1,659,041 | Morgan | Feb. 14, 1928 |
| 1,681,944 | Marshall, Jr. | Aug. 28, 1928 |
| 1,898,370 | Hughes et al. | Feb. 21, 1933 |
| 2,002,037 | McKenna | May 21, 1935 |
| 2,003,038 | Collins | May 28, 1935 |
| 2,005,623 | Heyer | June 18, 1935 |
| 2,152,405 | Dreischerf | Mar. 28, 1939 |
| 2,159,885 | Cullin | May 23, 1939 |
| 2,197,715 | Sekella | Apr. 16, 1940 |
| 2,544,955 | Harrelson | Mar. 13, 1951 |

FOREIGN PATENTS

| Number | Country | Date |
|---|---|---|
| 572,876 | France | Feb. 29, 1924 |

OTHER REFERENCES

Popular Science, December 1936, page 138.